3,351,525
COCCIDIOSTATIC COMPOSITIONS AND
METHODS OF USING SAME
Ernst Hodel, Basel, Switzerland, assignor to
J. R. Geigy A.-G., Basel, Switzerland
No Drawing. Filed May 6, 1963, Ser. No. 278,481
Claims priority, application Switzerland, May 11, 1962,
5,699/62, 5,700/62
8 Claims. (Cl. 167—53.1)

The present invention concerns new feeds which contain quinolyl-(8)-oxy acetic acid derivatives as active ingredients, in addition, processes for the production of these active ingredients, the active ingredients themselves as well as their salts with organic and inorganic acids.

It has been found that compounds of the formula

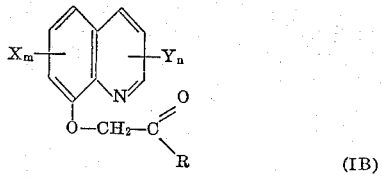

wherein R represenst the hydroxy group, an alkoxy radical with 1 to 5 carbon atoms, or the group

in which group:

each of $R_1$ and $R_2$, independently, represents hydrogen, alkyl with from 1 to 5 carbon atoms, lower alkoxy-lower alkylamino-, dialkylamino-, hydroxyalkoxy- and/or lower alkylamino-lower alkylamino-lower alkyl, e.g. the methoxymethyl, ethoxymethyl, ethoxyethyl, ethoxypropyl, methylaminomethyl, ethylaminoethyl, diethylaminoethyl, β-hydroxyethoxyethyl or the ethylamino-ethylaminoethyl radical; alkenyl with 2 to 5 carbon atoms, phenyl, chlorophenyl, or bromophenyl, or wherein:

$R_1$ and $R_2$ together with the adjacent nitrogen atom form a heterocyclic ring which may also contain oxygen or another nitrogen atom, i.e. piperidino, morpholino or piperazino, and wherein:

In case $R_1$ represents hydrogen, $R_2$ can also represent an amino group, each of X and Y, independently, represents a monovalent substituents as defined hereinafter, and
each of $m$ and $n$, independently, represents an integer ranging from 0 to 3, as well as the nontoxic water-soluble salts of the said compounds of Formula IB, are suitable for combatting coccidiosis and also for serving as prophylactics against the said disease. Another advantage of the active ingredients is that they have no unpleasant side effects and especially no embrionic deformations, and the animals fed therewith, for instance, fowls, rabbits, pigs, cattle, sheep, dogs and the like house and farm animals, are in excellent health.

Animal feeds according to the invention which contain, in combination, about 10 to 500 grams per ton of compounds of Formula IB, especially of those wherein R is the

group, and proteins in an amount of at least 17% and preferably about 20% and higher, based on the total weight of the feed, while being preferably nutritionally balanced, also show, apart from the above-described coccidiostatic properties, a pronounced growth-promoting effect in young animals and a weight-increasing effect which is due essentially to the formation of meat rather than fat even in adult animals subject to a so-called "fattening up" treatment. These growth-promoting and weight-increasing effects are surprisingly higher than the normal growth and weight increase achieved with the similar feeds which do not contain the aforesaid combination of ingredients.

The quinolyl-(8)-oxy-acetic acid derivatives of the Formula IB are obtained by reacting a compound of the formula

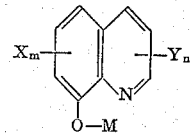

wherein

X, Y, $m$ and $n$ have the meanings given above, and
M represents an alkali metal atom or hydrogen, with a compound of the formula

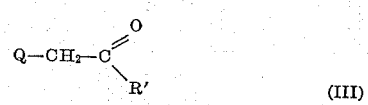

wherein

R′ represents a lower alkoxy radical or the group

Q represents a reactive substituent which can be split off as anion.

The reactive substituent Q which is split off as anion is derived from a strong acid; it is, for example, a halogen atom such as chlorine or bromine or the radical of an aromatic sulfonic acid. In the reaction the acid radical or halogen is split off as acid or hydrogen halide or as alkali metal or earth alkali metal salt and at the same time the bond between the radicals of compounds II and III is formed by way of oxygen. Generally, the reaction is performed in the presence of an organic, anhydrous solvent at temperatures between 50 and 150°. Aromatic hydrocarbons, chlorinated aromatic hydrocarbons, alkanols and also ketones are used as solvent. The tosyloxy-acetic acid amides which react easily can also be reacted with aqueous solutions of compounds of Formula IB. End products of the general Formula I, in which R is the hydroxyl group, are obtained by alkaline saponification of the end products of the process described. The quinolyl-(8)-oxy acetic acids are obtained either directly from the acid solution or by way of their difficulty soluble salts such as by way of the perchlorate.

Also, α-[5-chloroquinolyl-(8)-oxy]-acetic acid-n-butyl ester, α-[quinolyl-(8)-oxy]-acetic acid methyl ester and α-[quinolyl-(8)-oxy]-acetic acid isopropyl ester can be produced by the process described.

Salts with acids of compounds of the general Formula IB in which R is a lower alkoxy radical, or the group

are obtained by dissolving the reaction products of the process described above in an alcohol and/or ketone and then adding at least an equivalent amount of an organic or inorganic acid. The salts crystallize directly out of the solution.

As used in the general Formula IB in this specification and the appended claims, each of X and Y stands for the following monovalent substituents: alkyl with 1 to 5 carbon atoms; halogenated alkyl radicals with 1 to 5 carbon atoms wherein halogen is chlorine, bromine and/or fluorine; unsubstituted phenyl; nitrophenyl; chlorophenyl; bromophenyl; lower alkyl phenyl; hydroxyphenyl; benzyl; lower alkylbenzyl; chlorobenzyl; bromobenzyl; halogen, i.e. fluorine, chlorine, bromine, iodine; unsubstituted lower alkanoic, particularly acetyl, propionyl, butyryl or isovaleryl radicals; benzoyl; halogenated alkanoic radicals with 2 to 6 carbon atoms wherein halogen is chlorine, bromine and/or fluorine; chlorobenzoyl, nitrobenzoyl; the phenacyl radical; the nitro group; the amino group; acyl-amino groups wherein acyl is derived from the above-listed acids; and mono-lower alkylamino and dialkyl-amino.

As starting compounds of the general Formula II, the corresponding 8-hydroxyquinoline derivatives and their salts, e.g. potassium salts, are used. The 8-hydroxyquinoline derivatives are converted into the corresponding potassium compounds, for example, with calcined potassium carbonate, and the potassium compounds are then reacted, without previous isolation, with the corresponding reactive glycolic acid esters of general Formula III. The potassium compounds of 8-hydroxyquinoline derivatives used for the process according to the present invention can also be obtained, e.g. by concentrating the alcoholic solutions of 8-hydroxyquinoline derivatives and potassium hydroxide together. The halogen acetic acid esters or tosyloxyacetic acid esters can be used, for example, as reactive glycolic acid esters of the general Formula III.

"Lower" as used in connection with aliphatic radicals means that the latter are radicals with from 1 to 5 carbon atoms unless stated otherwise.

The substances of Formula IB can be added to suitable animal feeds directly in solid form or in solution. It is also possible to mix the substances of Formula I to non-toxic inorganic or organic carriers and then to mix the resulting concentrate of the said substances with other conventional additives such as mineral substances, vitamins and meat extracts rich in protein. These so-called "pre-mixtures," with or without additives other than the carrier, contain, for example, 5–50%, and preferably about 10 to 25% of a substance of Formula IB. A suitable amount of this pre-mixture is then equally distributed in a mixer in a commercial feed such as a corn mixture or other vegetable or animal substances. The finished coccidiostatic feed according to the invention contains the active substance in a concentration of about 10 to 500 grams per ton of feed.

As stated above, growth- and meat-formation-promoting and concurrently coccidiostatic feeds according to the invention, containing a compound of Formula IB in the last-mentioned concentrations, are obtained by adding the aforesaid pre-mixtures with nutritionally balanced feeds having a protein content of at least about 17% and preferably of about 20% and higher.

No practical improvement of growth-promotion and meat formation had been observed where the above-mentioned critical protein content was not present.

The following nonlimitative examples serve to illustrate the process according to the invention. Parts and percentages are given by weight unless stated otherwise and the temperatures are in degrees centigrade ("abs." stands for "anhydrous").

*Example 1*

21 parts of 99% chloroacetamide are added in small portions over 45 minutes, while stirring, to a suspension of 36.6 parts of the potassium salt of 8-hydroxyquinoline (obtained by concentrating a hot alcoholic solution of equivalent parts of 8-hydroxyquinoline and potassium hydroxide in vacuo) in 390 parts of boiling abs. benzene. After further stirring under reflux for 90 minutes the yellow color of the potassium compound disappears and the reaction medium, which was strongly alkaline at the beginning, becomes so weak that brilliant yellow indicator paper just turns red when moistened with a sample of the substance. The precipitate formed is filtered off under suction and washed with 11 parts by volume of benzene. The brown residue is treated with cold water until all the inorganic salts have been removed. The crude product (M.P. 163–165°) is recrystallized twice from hot water and the pure α-[quinolyl-(8)-oxy]-acetic acid amide is obtained as colorless needles which melt at 168–169°.

*Example 2*

45 parts of the potassium salt of 5 - aceto - 8 - hydroxyquinoline (produced from equivalent parts of 5 - aceto-8 - hydroxy - quinoline and potassium hydroxide, crystalline powder) are suspended in 300 parts by volume of xylene. 21 parts of chloroacetamide (99%) are added in portions over 45 minutes while stirring at a temperature of 130 to 140°. After refluxing for 1 to 3 hours, the yellow color has disappeared and the reaction is neutral to litmus paper. The precipitate formed is filtered off under suction and washed with 150 parts by volume of benzene. The residue is washed with water until all the inorganic salts have been removed and is then dried. The crude product (M.P. 209 to 213°) is purified by recrystallizing twice from abs. ethanol; α - [5 - acetoquinolyl-(8)-oxy]acetic acid amide is then obtained in the form of pale yellow crystals which melt at 218 to 220°.

*Example 3*

A solution is prepared from 61 parts of α - [2 - methyl-quinolyl - (8) - oxy] - acetic acid ethyl ester (produced from 2 - methyl - 8 - hydroxyquinoline and chloroacetic acid ethyl ester, yellow oil, B.P. 145–147°, solidifies in the cold) in 300 parts by volume of abs. ethanol and ammonia is introduced thereinto while stirring at 0–5° until saturation is reached. The reaction product precipitates out in crystalline form after a short time. To complete the reaction, the mixture is stirred overnight at room temperature. The reaction product is filtered off under suction and washed with water and 100 parts by volume of ether. The crude product melts at 188–190°. On recrystallising from a great deal of water or 50% aqueous methanol, α-[2 - methyl - quinolyl - (8) - oxy]-acetic acid amide is obtained as colorless needles which melt at 190–191°.

21.6 parts of α - [2 - methyl - quinolyl - (8) - oxy]-acetic acid amide are dissolved in 700 parts of acetone and 180 parts of methyl alcohol and 8.3 parts of concentrated hydrochloric acid are added. The hydrochloride of α - [2 - methyl - quinolyl - (8) - oxy] - acetic acid amide separates out as a pale yellowish coloured precipitate. M.P. 223–224° with decomposition. It is easily soluble in water.

Example 4

49 parts of chloroacetamide (99%) are added in portions while stirring at 40–50° to a solution of 79.5 parts of 2 - methyl - 8 - hydroxyquinoline in 400 parts by volume of anhydrous acetone, the addition being made in the presence of 79 parts of calcined potassium carbonate. The reaction mixture is then refluxed for 12 hours. A sample diluted with alcohol should give at most only a pale green colour with a drop of a dilute aqueous $FeCl_3$ solution. The reaction mixture is cooled to 10°. The precipitate formed is filtered off under suction and washed with about 50 parts by volume of cold acetone. To remove the inorganic salts, the filter residue is washed with cold water (test for the presence of Cl ions). The crude α - [2 - methyl - quinolyl - (8) - oxy] - acetic acid amide (M.P. 187–189°) is recrystallised from a great deal of water; a pure product is obtained as colourless needles; M.P. 190–191°.

Example 5

24.9 parts of 5 - benzoyl - 8 - hydroxy - quinoline are dissolved warm in 300 parts by volume of anhydrous acetone and then 16 parts of calcined potassium carbonate are added. The mixture is brought to the boil and then 10.5 parts of chloroacetamide are added in portions over 45 minutes while stirring at 55–60°. As the reaction only takes place slowly, another 6 parts of chloroacetamide are added to the reaction mixture in portions at intervals of 2 hours. To reduce the reaction time, 0.2 part of sodium iodide are added as catalyst. If a sample of the reaction mixture with a drop of an aqueous $FeCl_3$ solution gives no green or black colour, the reaction can be regarded as completed. The precipitate formed is filtered off hot under suction and washed with 100 parts by volume of acetone. To remove the inorganic salts, the residue is then treated with a sufficient amount of water. The portion which is insoluble in water is recrystallized from ethanol. α - [5-benzoyl - quinolyl - (8) - oxy] - acetic acid amide is obtained as felted, almost white needles which melt at 198 to 199°.

Example 6

400 parts by volume of abs. toluene are poured over 38 parts of 6 - nitro - 8 - hydroxyquinoline and 32 parts of calcined potassium carbonate. The mixture is heated and 21 parts of chloroacetamide are added in portions over half an hour while stirring at 110–115°. After 12 hours, another 7 parts of chloro-acetamide are added in small portions. After refluxing for 36 hours, the precipitate formed is filtered off hot under suction and washed with a small amount of hot toluene. The brown residue is washed with water until the inorganic salts have been removed and is then recrystallized from ethylene glycol monoethyl ether. α - [6 - nitroquinolyl] - (8) - oxy]-acetic acid amide is obtained as yellow platelets; M.P. 255–258°. α - [6 - amino - quinolyl - (8) - oxy] - acetic acid amide is obtained by catalytic hydrogenation of a suspension of α - [6 - nitro - quinolyl - (8) - oxy] - acetic acid amide in ethanol in the presence of Raney nickel. After recrystallization from ethanol, it is obtained in the form of pale yellow needles; M.P. 226–227°.

Example 7

300 parts by volume of abs. xylene are poured over 22.8 parts of 5 - chloro - 7 - iodo - 8 - hydroxyquinoline and 12 parts of calcined potassium carbonate. The mixture is brought to the boil and then 7.7 parts of chloroacetamide are added in portions over half an hour while stirring. The reaction mixture is heated for 12 hours while stirring. A further 4 parts of chloroacetamide are added in small portions and the whole is stirred until a sample gives no green or black colour with a dilute aqueous ferric chloride solution. The solution is then separated from the resinous residue and the xylene solution is cooled while stirring. The yellow precipitate is filtered off under suction and washed with petroleum ether. To remove inorganic salts, the filter residue is washed with water. The dry crude product is then recrystallised from alcohol. α - [5 - chloro - 7 - iodo - quinolyl - (8) - oxy] - acetic acid amide is obtained as almost white needles; M.P. 205–207°.

Example 8

36.7 parts of α - [2 - methyl - quinolyl - (8) - oxy]-acetic acid ethyl ester dissolved in 30 parts by volume of abs. ethanol are added to 70 parts of methylamine (33%) in abs. ethanol. The temperature quickly rises to about 40°. The whole is stirred until, after 3 hours, the reaction product begins to separate out. To complete the reaction, the reaction mixture is stirred overnight. It is then cooled to 5°, the precipitate formed is filtered off under suction, washed with water to remove excess methylamine and the filter residue is dried. The crude product is then recrystallised from a mixture of benzene/petroleum ether. α - [2 - methyl - quinolyl - (8) - oxy] - acetic acid - N - methylamide crystallises into long colourless rods and needles; M.P. 133–135°.

Example 9

A solution of 36.7 parts of α-[2-methyl-quinolyl-(8)-oxy]-acetic acid ethyl ester in 30 parts by volume of abs. ethanol is poured into 54.7 parts of n-butylamine in 50 parts by volume of abs. ethanol. The temperature rises towards 40° and the whole is stirred for 24 hours at 40–45°. The solvent is distilled off and the oily residue is fractionated. The α-[2-methyl-quinolyl-(8)-oxy]-acetic acid-N-n-butylamide solidifies into white crystals which melt at 69–72°. It boils at 173–176° under 0.04 mm. pressure.

Example 10

21.7 parts of 8-hydroxyquinoline are dissolved in 200 parts by volume of dry acetone and the solution is heated with 22 parts of calcined potassium carbonate while stirring at 40–50°. 24.7 parts of chloroacetic acid-N,N-diethylamide are added dropwise within half an hour, whereupon the reaction mixture is boiled for 24 hours under reflux while stirring. The precipitate is filtered off under suction and the filter residue is washed with 200 parts by volume of acetone. The inorganic salts remain on the filter. On concentrating the acetone solution, a red-yellow oil separates which is fractionated. The α-[quinolyl-(8)-oxy]-acetic acid-N,N-diethylamide is obtained as a red-yellow oil; $B.P._{0.05}$ 182–184°.

Example 11

33.7 parts of the potassium salt of 5-aceto-8-hydroxyquinoline are suspended in 200 parts by volume of abs. xylene. The suspension is brought to the boil (130–135°) and then 24.7 parts of chloroacetic acid-N,N-diethylamide are added dropwise within half an hour while stirring. The whole is refluxed for about 2½ hours until the yellow colour of the potassium compound has disappeared. A sample on moistened brilliant-yellow indicator paper shows that the mixture is only still weak alkaline. The crystals which precipitate are filtered off under suction, washed with xylene and, to remove the inorganic salts, the brown residue is washed with warm water. The dried crude product (M.P. 143–144°) is then recrystallised twice from a mixture of benzene/petroleum ether. The α-[5 - aceto - quinolyl - (8)-oxy]-acetic acid-N,N-diethylamide is obtained as pale reddish coloured rods; M.P. 144–145°.

The same compound is obtained on using an equivalent amount of bromoacetic acid diethylamide or tosyloxy acetic acid diethylamide.

Example 12

87 parts of 2-diethylaminoethylamine in 50 parts by volume of abs. ethanol are mixed with a solution of 36.8 parts of α-[2-methyl-quinolyl-(8)-oxy]-acetic acid ethyl ester in 50 parts by volume of abs. ethanol. The temperature of the mixture rises to 35°. It is left to stand for 20 hours 40–45°. After distilling off the solvent, an oil which quickly solidifies remains which is purified by distillation. The main fraction distills at 183–185° under 0.08 mm. pressure as a viscous yellow oil. In the cold it solidifies and the crystalline mass is recrystallised from a great quantity of petroleum ether. α-[2-methyl-quinolyl-(8)-oxy]-acetic acid-N-(β-diethylaminoethyl)-amide is obtained as white crystals; M.P. 55–57°.

*Example 13*

16 parts of calcined potassium carbonate and 0.2 part of sodium iodide are added to a solution of 18 parts of 5-chloro-8-hydroxyquinoline in 300 parts by volume of dry acetone. 18.5 parts of chloroacetanilide are quickly added at 55–60° while stirring. After 8 hours, another 4 parts of chloroacetanilide are added whereupon the reaction mixture is refluxed overnight: It is cooled and the crystals which have precipitated are filtered off under suction. The filter residue is washed with a little acetone and then with water. On recrystallising from ethanol, colourless crystals of pure α-[5-chloro-quinolyl-(8)-oxy]-acetic acid anilide are obtained, M.P. 178–179°.

*Example 14*

23.1 parts of α-[quinolyl-(8)-oxy]-acetic acid ethyl ester (produced from 8-hydroxyquinoline and chloroacetic acid ethyl ester) and 14 parts of 4-chloroaniline are refluxed for 20 hours (temperature 186–190°), oil temperature 240–250°. The greater part of the 1,2-dichlorobenzene is then distilled off whilst the temperature rises to 210°. The oily residue is poured into a mixture 200 parts by volume of ice water and 30 parts by volume of hydrochloric acid and the whole is stirred until a solid is formed. The precipitate is filtered off under suction, and washed first with ether and then with warm water containing ammonia. A grey coloured substance which melts at 141–143° is obtained from which, after recrystallization from the pure α-[quinolyl-(8)-oxy]-acetic acid-[4′-chloroanilide] is obtained as yellow needles which melt at 142–144°.

*Example 15*

11.9 parts of 8-hydroxy-quinaldine and 12 parts of calcined potassium carbonate are suspended in 200 parts by volume of dry acetone and 0.1 part of sodium iodide are added. 15 parts of 4-chloroacetic acid morpholide are then quickly added dropwise and the whole is boiled while stirring. The reaction is completed after 6 hours. The reaction mixture is cooled and the precipitate formed is filtered off under suction. The inorganic salts are washed out of the filter residue with water. The crude product is then dried. After recrystallising from benzene, α-[2-methylquinolyl-(8)-oxy]-acetic acid morpholide is obtained as colourless rods which melt at 178–180°.

*Example 16*

23.1 parts of α-[quinolyl-(8)-oxy]-acetic acid ethyl ester dissolved in 50 parts by volume of ethanol are poured into a mixture of 100 parts of hydrazine hydrate and 50 parts by volume of ethanol while stirring. The temperature rises to 31°. The whole is stirred for 15 hours at this temperature whereupon the reaction product begins to separate out. The precipitate is filtered off under suction and thoroughly washed with water until the excess hydrazine has been removed. The crude product, M.P. 137–138°, is recrystallised from water and the pure α-[quinolyl-(8)-oxy]-acetic acid hydrazide is obtained as white needles which melt at 137–138°.

*Example 17*

27 parts of α-[5,7-dichloroquinolyl-(8)-oxy]-acetic acid ethyl ester (produced from the potassium salt of 8-hydroxy-5,7-dichloroquinoline and chloroacetic acid ethyl ester) are added to 90 parts of hydrazine hydrate which has been diluted with 150 parts by volume of ethanol. No solution is formed and the rise in temperature is only slight. The whole is stirred for 24 hours at room temperature and the product is worked up as described in Example 16. The α-[5,7-dichloroquinolyl-(8)-oxy]-acetic acid hydrazide recrystallises from a mixture of benzene and ethanol in colourless needles which melt at 191–193°.

*Example 18*

18.7 parts of α-[5,7-dibromoquinolyl-(8)-oxy]-acetic acid methyl ester (produced from 5,7-dibromo-8-hydroxyquinoline and chloroacetic acid methyl ester) are added to 20 parts of hydrazine hydrate which have been diluted with 130 parts by volume of ethanol. Only a slight rise in temperature can be observed. The mixture is stirred vigorously for 8 hours at 40°. The product is worked up in the same manner as described in Example 16. The α-[5,7-dibromoquinolyl-(8)-oxy]-acetic acid hydrazide crystallises from benzene in colorless needles which contract at 210° and decompose at over 230°.

In an analogous manner as in the preceding examples the following compounds falling under Formula I are obtained from the corresponding starting materials of Formulas II, III, IV and V, in which Formulas X, Y, $R_1$, $R_2$, M, Z, $Q_1$, $Q_2$, $m$ and $n$ have the following meanings:

| Exp. No. | X | Y | $R_1$ | $R_2$ | M | Z | $Q_1$ | $Q_2$ | $m$ | $n$ |
|---|---|---|---|---|---|---|---|---|---|---|
| 19 | | 2-CH₃ | —CH₂CH=CH₂ | —CH₂CH=CH₂ | Na | Cl | | | 0 | 1 |
| 20 | 5-CH₃ | 2-CH₃ | —CH₂CH=CH₂ | —CH₂CH=CH₂ | K | Cl | | | 1 | 1 |
| 21 | 5-Cl | | —CH₂CH=CH₂ | —CH₂CH=CH₂ | H | Br | | | 1 | 0 |
| 22 | 5-COCH₃ | | 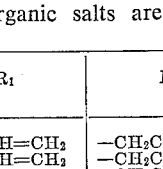 | | H | 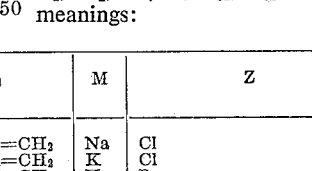 | | | 1 | 0 |
| 23 | 5-CO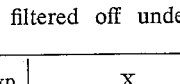 | 2-CH₃ | H | —NH₂ | | | —OC₂H₅ | H | 1 | 1 |
| 24 | 5-CO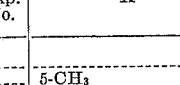 | 2-CH₃ | H | H | K | Cl | | | 1 | 1 |
| 25 | 5-CH₂—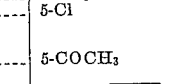 | | H | H | K | Cl | | | 1 | 0 |
| 26 | 6-CH₃ | | H | H | K | Cl | | | 1 | 0 |
| 27 | 6-NH₂ | | H | —NH₂ | | | —OC₂H₅ | H | 1 | 0 |
| 28 | 5-C₂H₅ | | H | H | Na | Cl | | | 1 | 0 |
| 29 | 5-COC₄H₉ | | H | H | K | Cl | | | 1 | 0 |
| 30 | 5-COCH₂CH(CH₃)₂ | | H | H | K | Cl | | | 1 | 0 |
| 31 | 5-COCH₃ | | —n-C₄H₉ | —CH₃ | K | Cl | | | 1 | 0 |
| 32 | 5-CH₃ | 2-CH₃ | H | H | Na | Cl | | | 0 | 1 |
| 33 | | 2-CH₃ | H | —NH₂ | | | —OC₂H₅ | H | 0 | 1 |
| 34 | 5-Cl | | H | —NH₂ | | | —OC₂H₅ | H | 0 | 1 |
| 35 | 5,7-di-Cl | | H | H | K | Cl | | | 2 | 0 |
| 36 | 5-CH₃ | | H | H | Na | Cl | | | 1 | 0 |

The number preceding a substituent in the above table indicates the positions of that substituent at the quinoline nucleus.

The following salts were obtained with the corresponding acid from the compounds of Formula I prepared as described in example given in the second column:

| Example No. | Example given preparation of compound of Formula I | Acid | Salt |
|---|---|---|---|
| 37 | 3 | Hydrochloric | α-[2-methyl-quinolyl-(8)-oxy]-acetic acid amide hydrochloride. |
| 38 | 9 | ...do... | α-[2-methyl-quinolyl-(8)-oxy]-acetic acid-N-n-butylamide hydrochloride. |
| 39 | 3 | Citric | α-[2-methyl-quinolyl-(8)-oxy]-acetic acid amide citrate. |
| 40 | 3 | Phosphoric | α-[2-methyl-quinolyl-(8)-oxy]-acetic acid amide phosphate. |
| 41 | 3 | Sulfuric | α-[2-methyl-quinolyl-(8)-oxy]-acetic acid amide sulfate. |
| 42 | 3 | Aspartic | α-[2-methyl-quinolyl-(8)-oxy]-acetic acid amide asparaginate. |
| 43 | 3 | Malic | α-[2-methyl-quinolyl-(8)-oxy]-acetic acid amide malate. |
| 44 | 3 | Salicylic | α-[2-methyl-quinolyl-(8)-oxy]-acetic acid amide salicylate. |
| 45 | 3 | Glutaminic | α-[2-methyl-quinolyl-(8)-oxy]-acetic acid amide glutaminate. |
| 46 | 3 | Tartaric | α-[2-methyl-quinolyl-(8)-oxy]-acetic acid amide tartrate. |

In an analogous manner as in the preceding examples also compound of Formula I are obtained, wherein $R_1$, $R_2$, X, Y, $m$ and $n$ have the meanings listed below:

| Example No. | $R_1$ | $R_2$ | X | Y | $m$ | $n$ |
|---|---|---|---|---|---|---|
| 47 | —$CH_3$ | —$C_2H_5$ | $ClC_2H_4$— |  | 1 | 0 |
| 48 | —$C_5H_{11}$ | —$C_5H_{11}$ | $CF_3$ |  | 1 | 0 |
| 49 | —$CH_2OCH_3$ | —$CH_2OCH_3$ | $CF_3$ |  | 1 | 0 |
| 50 | —$C_2H_4OC_2H_5$ | —$C_2H_4OC_2H_5$ | phenyl |  | 1 | 0 |
| 51 | —$CH_2NHCH_3$ | —$CH_2NHCH_3$ | $NO_2$-phenyl | —$CH_3$ | 1 | 1 |
| 52 | —$C_2H_4$—O—$C_2H_4OH$ | —$C_2H_4$—O—$C_2H_4OH$ | Cl-phenyl | —$CH_3$ | 1 | 1 |
| 53 | —$CH_2$—CH=$CH_2$ | —$CH_2CH$=$CH_2$ | —$C_4H_9$ | phenyl-Cl | 1 | 1 |
| 54 | H | —$NH_2$ | phenyl-$OC_2H_5$ | —$C_2H_5$ | 1 | 1 |
| 55 | H | —$NH_2$ | phenyl-CO—$CH_2$— |  | 1 | 0, 1 |
| 56 | —N(morpholino)— |  | —$CH_2$-phenyl |  | 1 | 0 |
| 57 | $C_2H_5$ | —$C_2H_5$ | —$CH_2$-phenyl-Cl | —$CH_3$ | 1 | 1 |
| 58 | —N(piperazino)N— |  | —$CH_2$-phenyl-Br | —$CH_3$ | 1 | 1 |
| 59 | —N(piperidino)— |  | $CH_3CH_2CO$— | —$CH_3$ | 1 | 1 |
| 60 | H | —$NH_2$ | $CH_3CH_2CHCl$—CO— | —$CH_3$ | 1 | 1 |
| 61 | phenyl | H | Br—phenyl—CO— |  | 1 | 0 |

| Example No. | R₁ | R₂ | X | Y | m | n |
|---|---|---|---|---|---|---|
| 62 | —C₆H₄—Cl | H | Cl,Cl-C₆H₃—CO— | | 1 | 0 |
| 63 | H | H | NO₂-C₆H₄—CO— | | 1 | 0 |
| 64 | —CH₃ | —CH₃ | CH₃CONH— | | 1 | 0 |
| 65 | H | —NH₂ | C₃H₇CONH— | | 1 | 0 |
| 66 | H | H | C₆H₅—CO—NH— | | 1 | 0 |
| 67 | —CH₂NHCH₃ | —CH₃ | C₆H₅—CO— | —CH₃ | 1 | 1 |
| 68 | H | —NH₂ | Br-C₆H₄—CO— | | 1 | 0 |
| 69 | —C₂H₅ | —C₂H₅ | (CH₃)₂N— | | 1 | 0 |
| 70 | H | H | C₂H₅NH— | —CH₃ | 1 | 1 |

Some examples are given below for preferred feed compositions according to the invention illustrating the practical application of the active substances according to the invention. In these examples I.U. stands for international unit, kg. for kilogram, g. for gram and mg. for milligram.

Example 71

As active ingredient [5-acetoquinolyl-(8)-oxy]-acetic acid diethylamide is mixed in a proportion of 100 mg. per kg. into a usual commercial chicken meal. To attain a good distribution first a concentrate containing 20% of active substance is prepared in a mortar by means of calcium carbonate or cellulose powder or previously sieved chicken meal. This is then made into a mixture containing 5% active substance by the addition of sieved chicken meal which is finally worked up into a feed containing 0.01% of active substance, which feed has the following composition (I.U. per kg.=international units per kilogram):

Roughage _____ 4.5%.
Crude protein _____ 18.5%.
Digestible protein _____ 15.7%.
Total nutrients _____ 66.5%.
Vitamin A _____ 9000 I.U. per kg. of feed.
Vitamin D _____ 1200 I.U. per kg. of feed.
Vitamin B₂ _____ 6 mg. per kg. of feed.

This feed mixture containing 0.01% of the above active substance was given for 4 weeks ad libitum to white rats having an initial weight of 80 g. After 4 weeks, the increase in weight and feed efficiency were greater than was the case with control animals receiving the same feed but without active substance.

Also, for example, α-[2-methyl-5,7-dichloroquinolyl-(8)-oxy]-acetic acid hydrazide or quinolyl-(8)-oxy acetic acid anilide can be used as active substances with equally good results.

Example 72

α-[2-methyl-quinolyl-(8)-oxy]-acetic acid n-butyl-amide, as active substance, is added in a proportion of 300 mg. per kg. to a commercial chicken meal of the composition given in Example 19 prepared by way of the concentrate and premixture and the feed so prepared is given to 2 week old chickens. After 4 weeks, a greater increase in weight and slightly improved feed efficiency were attained with the feed mixture used than with the control feed.

The food additive in every case caused a remarkable decrease in mortality and better weight development in comparison with the control tests.

Example 73

The water soluble hydrochloride of α-[2-methylquinolyl-(8)-oxy]-acetic acid amide is rubbed with dextrin or sugar to form a 20% concentrate. 1 g. of this mixture, dissolved in 4 liters of full cream milk having a total content of about 25–30% by weight of protein calculated on the dry weight of the milk was given to 10–20 day old calves once daily for 4 weeks. The calves fed in this way with 50 mg. active substance per liter milk have a better increase in weight than those which received no additive with the milk.

Example 74

α-[2-methyl-quinolyl-(8)-oxy]-acetic acid amide was rubbed with sieved feed to form a 5% concentrate. Portions of this mixture were mixed with a commercial pig meal and given to piglets so that each animal received at each feed 100 mg. of active substance per kg. of pig meal.

The groups of test animals (4–6 piglets) showed a greater increase in weight than the control animals.

Feed composition:
Roughage _____ 4–6%.
Crude protein _____ 18–20%.
Total nutrients _____ 67–70%.
Vitamin A _____ 4000 I.U./kg.
Vitamin D₃ _____ 600 I.U./kg.

Also, for example, the phosphate or glutaminate of α-[2-methyl-quinolyl-(8)-oxy]-acetic acid amide, or α-[5-benzoyl-quinolyl-(8)-oxy]-acetic acid amide, or quinolyl-(8)-oxy acetic acid n-butylamide can be used as active substances with equally good results.

The following examples illustrate the productions of compounds of Formula IB in which R is a substituent other than

Example 75

31 parts of chloroacetic acid ethyl ester are added dropwise within 1 hour while stirring to a suspension of 39.4 parts of the potassium salt of 5-methyl-8-hydroxyquinoline (produced by evaporating the hot alcoholic solution of equivalent parts of 5-methyl-8-hydroxyquinoline and potassium hydroxide in vacuo) in 200 parts by volume of boiling abs. benzene. After stirring for 3 to 4 hours, the yellow color of the potassium compound disappears and the initially strong alkaline reaction has so weakened that brilliant yellow paper just turns red when moistened with a sample. The precipitate is filtered off hot under suction and washed with 100 parts by volume of benzene. The potassium chloride remains on the filter. The filtrate is evaporated in a water bath and the oily residue is fractionally distilled under reduced pressure. The main fraction passes over at 170–173° under 0.1 mm. pressure as a yellow liquid which afterwards solidifies. Recrystallized from a mixture of petroleum ether/benzene, α-[5-methyl-quinolyl-(8)-oxy]-acetic acid ethyl ester is obtained in the form of almost colorless crystals which melt at 92–93°.

In a similar manner, α-[2-methyl-5-benzoyl-quinolyl-(8)-oxy]-acetic acid ethyl ester is obtained by using an equivalent amount of the corresponding starting quinoline derivative in lieu of the above-mentioned potassium salt of 5-methyl-8-hydroxyquinoline.

Example 76

45 parts of the potassium salt of 5-aceto-8-hydroxyquinoline (produced by joining the hot alcoholic solutions of equivalent parts of 5-aceto-8-hydroxyquinoline and potassium hydroxide) are suspended in 200 parts by volume of abs. xylene. The whole is heated until the xylene boils (130–135°) and then 25 parts of chloroacetic acid methyl ester are added dropwise within 50 minutes while stirring. To complete the reaction, the whole is refluxed while stirring for another 15–20 hours. At the end of this time the reaction mixture has a neutral reaction and the yellow color of the potassium compound has disappeared. The potassium chloride is filtered off under suction and washed with 150 parts by volume of benzene. The filtrate is concentrated on a water bath and left to crystallize. The brown crude product (M.P. 162–163°) is then purified by recrystallization from benzene and then from methanol. The α-[5-acetoquinolyl-(8)-oxy]-acetic acid methyl ester is obtained in the form of yellow-white crystals which melt at 165–167°.

Example 77

38 parts of 6-nitro-8-hydroxyquinoline was dissolved in 450 parts by volume of abs. toluene. 32 parts of calcined potassium carbonate are added and then the whole is brought to the boil (about 110°) and 30 parts of chloroacetic acid ethyl ester are added dropwise within 1 hour while stirring. After stirring for 12 hours, another 20 parts of chloroacetic acid ethyl ester are added. The reaction is complete after 36 hours. A sample in alcohol only shows a slight green color with a dilute aqueous solution of ferric chloride. The precipitate formed is filtered off under suction, the potassium chloride is washed out with a little warm toluene and the dark filtrate is allowed to crystallize while cooling with ice. The crude product is brown-yellow colored and melts at 142–144°. Recrystallization from benzene, the α-[6-nitro-quinolyl-(8)-oxy]-acetic acid ethyl ester is obtained as yellow crystals which melt at 143–145°.

The α-[6-amino-quinolyl-(8)-oxy]-acetic acid ethyl ester is obtained by catalytic hydrogenation in alcoholic solution in the presence of Raney nickel. Recrystallized from benzene it is in the form of yellow crystals which melt at 127–129°.

The α-[6-acetamido-quinolyl-(8)-oxy]-acetic acid ethyl ester is obtained by acetylation with acetic acid anhydride. Recrystallized from benzene it is in the form of colorless needles which melt at 155–156°.

Example 78

34.5 parts of chloroacetic acid n-butyl ester are added dropwise while stirring to 45 parts of the potassium salt of the 5-aceto-8-hydroxyquinoline suspended in 200 parts by volume of boiling abs. xylene. After stirring for 2 hours under reflux, the precipitate formed is filtered off under suction and washed hot with 150 parts by volume of benzene. The filtrate is evaporated to dryness. Recrystallized from a great deal of ligroin, the α-[5-acetoquinolyl-(8)-oxy]-acetic acid n-butyl ester is obtained in the form of almost colorless flattish crystals which melt at 89–90°.

Example 79

80 parts of 8-hydroxyquinaldine are dissolved in 400 parts by volume of anhydrous acetone. After adding 76 parts of calcined potassium carbonate, 67 parts of chloroacetic acid ethyl ester are added dropwise while stirring and within 1 hour at 40–50°. The reaction mixture is refluxed overnight. The precipitate formed is filtered off hot and the inorganic salt mixture remaining on the filter is washed out with hot acetone. After distilling off the solvent, an oil is obtained which is purified by fractional distillation. The α-[2-methyl-quinolyl-(8)-oxy]-acetic acid ethyl ester passes over at 145–147° under 0.02 mm. pressure as a yellow viscous oil which, in the cold solidifies into almost white crystals which melt at 36–38°.

Example 80

200 parts by volume of anhydrous acetone are poured over 39.7 parts of 8-hydroxyquinaldine and 38 parts of calcined potassium carbonate. 34.5 parts of chloroacetic acid n-butyl ester are added dropwise at 40–50°, the reaction mixture is refluxed while stirring overnight. The product is worked up as described in Example 79. The α-[2-methyl-quinolyl-(8)-oxy]-acetic acid n-butyl ester is a red-yellow, viscous oil and boils at 151–154°/0.04 mm.

Example 81

500 parts by volume of anhydrous acetone are poured over 45.6 parts of 2-methyl-5,7-dichloroquinoline and 32 parts of calcined potassium carbonate. The mixture is brought to the boil (55–60°) and 24 parts of chloroacetic acid methyl ester are added dropwise within 40 minutes while stirring. 0.2 part of sodium iodide are then added as catalyst so that the reaction is completed after 8 hours. A sample thereof diluted in alcohol does not turn green with a drop of a diluted aqueous ferric chloride solution. Before the precipitate formed is filtered off under suction, another 200 parts by volume of warm acetone are added and the residue on the filter is washed with a further 200 parts by volume of acetone. The filtrate is concentrated to 200 parts by volume on a water bath and left to crystallize. The almost white crude product, obtained by filtration under suction, melts at 119–121° and can be further purified by recrystallization from a mixture of petroleum ether/benzene. The α-[2-methyl-5,7-dichloroquinolyl-(8)-oxy]-acetic acid methyl ester is obtained as colorless needles which melt at 119–121°.

Example 82

43 parts of 5-n-butyro-8-hydroxyquinoline are dissolved warm in 350 parts by volume of anhydrous acetone. After adding 32 parts of calcined potassium carbonate and 0.2 part of sodium iodide and bringing the reaction mixture to the boil, 24 parts of chloroacetic acid methyl ester are added dropwise while stirring. The reaction is complete after stirring under reflux for about 15 hours. The greater part of the reaction product has precipitated. The mixture is cooled to 10° to complete the precipitation. The precipitated reaction product is filtered off under suction and washed with a little acetone. The inorganic salts are removed with water and, after drying, a yellow-white crude product is obtained which melts at 107–109°. Recrystallised from a mixture of equal parts of benzene and petroleum ether, the α-[5-butyro-quinolyl-(8)-oxy]-acetic acid methyl ester is obtained in colourless rods which melt at 114–115°.

*Example 83*

350 parts by volume of anhydrous acetone are poured over 30.3 parts of 5,7-dibromo-8-hydroxyquinoline. 16 parts of calcined potassium carbonate and 0.2 part of sodium iodide. 10.3 parts of chloroacetic acid methyl ester are then added and the mixture is stirred under reflux for 8 hours. A further 5 parts of chloroacetic acid methyl ester are added and the whole is stirred overnight. The greater part of the reaction product precipitates so that the product can be worked up as described in Example 8. The α[5,7-dibromo-quinolyl-(8)-oxy]-acetic acid methyl ester, recrystallised from ethanol, is obtained in the form of colourless needles which melt at 149–150°.

*Example 84*

250 parts by volume of anhydrous acetone are poured over 13.9 parts of 3-ethyl-5-aceto-8-hydroxyquinoline, 10 parts of calcined potassium carbonate and 0.2 part of sodium iodide. The reaction mixture is then brought to the boil (55–60°) and 8 parts of chloroacetic acid methyl ester are added dropwise within half an hour while stirring. After 8 hours another 3 parts of chloroacetic acid methyl ester are added and the mixture is refluxed overnight. The precipitate formed is filtered off under suction, the residue is washed with 200 parts by volume of acetone and the filtrate is then concentrated to about 50 parts by volume. On adding petroleum ether the red-yellow coloured crude product (M.P. 92–95°) precipitates. The α-[3-ethyl-5-acetoquinolyl-(8)-oxy]-acetic acid methyl ester is obtained by recrystallisation from a mixture of petroleum ether/benzene in colourless, hair-like needles which melt at 94–95°.

*Example 85*

27.3 parts of α-[5-aceto-quinolyl-(8)-oxy]-acetic acid ethyl ester (produced from 5-aceto-8-hydroxyquinoline and chloroacetic acid ethyl ester) are dissolved in 150 parts by volume of 15% hydrochloric acid and the solution is heated for 1½ hours at 90–95°. The saponification product separates out when the mixture has been left to stand for 3 hours at about 5°. It is filtered off under suction, washed with petroleum ether and dried over sodium hydroxide in a vacuum desiccator. Recrystallised from hot water, the α-[5-aceto-quinolyl-(8)-oxy]-acetic acid is obtained in white needles which melt at 236–238° with decomposition.

The same compound is obtained by adding dropwise aqueous sodium hydroxide solution to a hot alcoholic solution of 5-aceto-8-hydroxy-quinoline and sodium chloroacetate. The solution is acidified with hydrochloric acid and the crude α-[5-aceto-quinolyl-(8)-oxy]-acetic acid separates out.

*Example 86*

36 parts of α-[5-benzyl-quinolyl-(8)-oxy]-acetic acid methyl ester (produced from 5-benzyl-8-hydroxyquinoline and chloroacetic acid methyl ester) are dissolved in 100 parts by volume of ethanol. 110 parts of aqueous 10% sodium hydroxide solution are then added. After refluxing for 3 hours, the reaction mixture is cooled to 30°, 100 parts by volume of water are added and the saponification product is separated out with 80 parts by volume of 15% hydrochloric acid. Recrystallised from water and then from 70% ethanol, the α-[5-benzyl-quinolyl-(8)-oxy]-acetic acid is obtained in pale yellowish little rods which melt at 178–179°.

*Example 87*

24.5 parts of α-[2-methyl-quinolyl-(8)-oxy]-acetic acid ethyl ester (produced from 8-hydroxyquinaldine and chloroacetic acid ethyl ester) are mixed with 100 parts by volume of water. 47 parts of aqueous 10% sodium hydroxide solution are added dropwise within half an hour at 80°. The whole is stirred at this temperature for another hour until a clear liquid is obtained whereupon the saponification is complete. As the saponification product is easily soluble in water even after acidifying, it is precipitated by the addition of 20 parts of about 70% perchloric acid at 30–40° in the form of the perchlorate. Recrystallised twice from hot water, small white needles are obtained which melt at 170–178°. According to analysis, this is a mixture of 24% of free α-[2-methyl-quinolyl-(8)-oxy]-acetic acid and 76% of its perchlorate.

*Example 88*

38 parts of calcined potassium carbonate are added to a solution of 44.8 parts of 5-chloro-8-hydroxyquinoline in 300 parts by volume of anhydrous acetone, and 25 parts of chloroacetic acid methyl ester are added dropwise within half an hour while stirring at a temperature of 40–50°. The mixture is then brought to the boil. On stirring overnight under reflux the reaction can be completed to such an extent that a sample diluted with ethanol gives no green colour with a drop of an aqueous ferric chloride solution. This shows that no more free 5-chloro-8-hydroxyquinoline is present. The mixture is filtered off under suction, the inorganic salts which remain are washed with 200 parts by volume of acetone and, after concentrating the filtrate and cooling the residue, crude α-[5-chloroquinolyl-(8)-oxy]-acetic acid methyl ester is obtained. It is purified and recrystallised from 50% ethanol; M.P. 105–106°.

*Example 89*

38 parts of calcined potassium carbonate are added to a solution of 44.8 parts of 5-chloro-8-hydroxyquinoline and 300 parts by volume of anhydrous acetone. 34.5 parts of chloroacetic acid n-butyl ester are added dropwise while stirring within 45 minutes at an inner temperature of 40–50°. The reaction mixture is then stirred overnight under reflux and 100 parts by volume of anhydrous acetone are added before filtering off under suction the precipitated inorganic salts. The filter residue is washed with 200 parts by volume of acetone. After concentrating the filtrate and then allowing it to stand while cooling with ice, the α-[5-chloroquinolyl-(8)-oxy]-acetic acid n-butyl ester is obtained as yellow-white crystals which melt at 88–90°. After recrystallising from 75% methanol, the ester melts at 90–92°.

*Example 90*

31.5 parts of chloroacetic acid isopropyl ester are added dropwise to 29 parts of 8-hydroxyquinoline, dissolved in 250 parts by volume of anhydrous acetone, and 32 parts of calcined potassium carbonate and 0.2 part of sodium iodide. After 8 hours at the boiling temperature of the acetone, a further 8 parts of chloroacetic acid isopropyl ester are added. The reaction is complete after stirring for 10 hours under reflux. The precipitated salts are then filtered off under suction and washed with 200 parts by volume of hot acetone. The solvent is distilled off. The residue, a red oil, is fractionated. α-[quinolyl-(8)-oxy]-acetic acid isopropyl ester is a pale viscous liquid and boils at 143–145°/0.02 mm.

α-[quinolyl-(8)-oxy]-acetic acid n-butyl ester is obtained in an analogous manner from 29 parts of 8-hydroxyquinoline, dissolved in 250 parts by volume of anhydrous acetone, 32 parts of calcined potassium carbonate, 0.2 part of sodium iodide and 44 parts of chloroacetic acid n-butyl ester. It is pale yellow colored viscous liquid which boils at 148–150°/0.05 mm.

*Example 91*

Concentrated hydrochloric acid is added dropwise to a solution of 5 parts of α-[5-aceto-quinolyl-(8)-oxy]-acetic acid ethyl ester in 200 parts by volume of acetone and 150 parts by volume of methanol, while stirring, until the reaction is slightly acid to congo paper. The whole is then stirred for about 1 hour at room temperature. The precipitated crystals are filtered off under suction and washed with anhydrous ether. The hydrochloride of α-[5-aceto-quinolyl-(8)-oxy]-acetic acid ethyl ester obtained melts at 96–98°.

Some further examples are given below for animal feeds and agents according to the invention useful for the combatting of coccidiosis:

*Example 92*

As active ingredient, α-[5-aceto-quinolyl-(8)-oxy]-acetic acid methyl ester in a proportion of 100 mg. per kg. is mixed into a usual commercial chicken meal. To attain a good distribution first a concentrate containing 20% of active substance is prepared in a mortar by means of calcium carbonate or cellulose powder or previously sieved chicken meal. This is then made into a mixture containing 5% active substance by the addition of sieved chicken meal which is finally worked up into a feeding stuff containing 0.01% of active substance, which feeding stuff has the following composition:

Feed:
```
Roughage _____ 4.5%.
Crude protein _____ 18.5%.
Digestible protein _____ 15.7%.
Total nutrients _____ 66.5%.
Vitamin A _____ 9,000 I.U./kg.
Vitamin D _____ 1,200 I.U./kg.
Vitamin B₂ _____ 6 mg./kg.
```

This feed mixture containing 0.01% of the above active substance was given for 4 weeks ad libitum to white rats having an initial weight of 80 grams. After 4 weeks, the increase in weight and feed efficiency were greater than was the case with control animals receiving the same feed but without active substance.

*Example 93*

α-[2-methyl-quinolyl-(8)-oxy]-acetic acid in n-butyl ester, as active substance, is added in a proportion of 300 mg. per kg. to a commercial chicken meal of the composition given in Example 18 prepared by way of the concentrate and premixture and the feed so prepared is given to 2 week old chickens. After 4 weeks, a greater increase in weight and slightly improved feed efficiency were attained with the feed mixture used than with the control feed.

*Example 94*

α-[2-methyl-quinolyl-(8)-oxy]-acetic acid ethyl ester or α-[5-aceto-quinolyl-(8)-oxy]-acetic acid n-butyl ester was homogeneously mixed as described in Example 92 with a commercial chicken feed of the composition mentioned in that example. The content of active substance was 0.025–0.05%.

For 5 days, this new feed mixture was given to 2–3 week old chickens (prophylaxis phase). Each of the fowls was then infected per os with 120–130,000 sporulated oocysts of *Eimeria tenella*, the mortality after the sixth day after infection was observed (infection phase) and on the surviving animals, after a further 6–8 days, the end weight (recovery phase) was determined and a section and microscopic analysis of the appendices was performed.

The food additive in every case caused a remarkable decrease in mortality and better weight development in comparison with the control tests.

*Example 95*

α-[2,5-dimethyl-quinolyl-(8)-oxy]-acetic acid amide was homogeneously mixed as described in Example 92 with a commercial chicken feed of the composition mentioned in that example. The content of active substance was 0.025–0.05%.

For 5 days, this new feed mixture was given to 2–3 week old chickens (prophylaxis phase). Each of the fowls was then infected per os with 120–130,000 sporulated oocysts of *Eimeria tenella*, the mortality after the sixth day after the infection was observed (infection phase) and on the surviving animals after a further 6–8 days, the end weight (recovery phase) was determined and a section and microscopic analysis of the appendices was performed.

The food additive in every case caused a remarkable decrease in mortality and better weight development in comparison with the control tests.

Also, for example, α-[2-methyl-quinolyl-(8)-oxy]-acetic acid amide, or α-[2-methyl-5,7-dichloroquinolyl-(8)-oxy]-acetic acid hydrazide, or α-[5-acetoquinolyl-(8)-oxy]-acetic acid diethylamide or α-[5-benzoylquinolyl-(8)-oxy]-acetic acid amide can be used as active substances with equally good results.

*Example 96*

α-[2-methyl-quinolyl-(8)-oxy]-acetic acid amide was rubbed with sieved feed to form a 5% concentrate. Portions of this mixture were mixed with a commercial chicken meal to obtain a feed composition containing 300 mg. per kg. feedstuff. The feed so prepared was given to 2 week old chickens. The group of test animals showed a greater increase in weight than the control animals.

Feed composition:
```
Roughage _____ 4–6%.
Crude protein _____ 18–20%.
Fat _____ 6%.
Total nutrients _____ 68–72%.
Sodium chloride _____ 0.4%.
Vitamin A _____ 4000 I.U. per kg.
Vitamin B₂ _____ 4 mg. per kg.
Vitamin B₃ _____ 800 I.U. per kg.
```

The composition of the total nutrients thereof being the following:

```
                                                    Percent
Maize _____ 24
Wheat _____ 12
Dry potatoes _____ 4
Barley _____ 5
Milo _____ 13
Oats (ground) _____ 7
Wheat bran freed from chaff _____ 7
Peanut grist _____ 4
Soya grist _____ 5
Codfish meal _____ 4
Herring meal _____ 3
Dry yeast _____ 2
Whey protein powder with fat _____ 3
Clover meal _____ 4
Bone grist _____ 1
```

I claim:

1. A process for controlling coccidiosis which comprises orally administering to an animal suffering therefrom, a member selected from the group consisting of
   (a) a compound of the formula

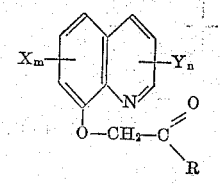

(IB)

(b) a compound of the formula

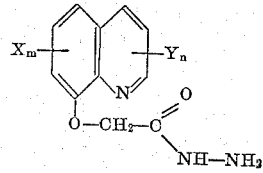

(IA)

(c) a water-soluble nontoxic salt of a compound of Formula IB, and
(d) a water-soluble nontoxic salt of a compound of Formula IA, in which Formulae IB and IA:

R represents a member selected from the group consisting of hydroxy, lower alkoxy and the radical

each of $R_1$ and $R_2$, independently, represents a member selected from the group consisting of hydrogen, alkyl with from 1 to 5 carbon atoms, alkenyl with from 2 to 5 carbon atoms, lower alkoxy-lower alkyl, mono-lower alkylamino-lower alkyl, di-lower alkylamino-lower alkyl, hydroxy-lower alkoxy-lower alkyl, lower alkylamino - lower alkylamino - lower alkyl, phenyl, chlorophenyl and bromophenyl, and $R_1$ and $R_2$ taken together is a member selected from the group consisting of morpholino, piperidino and piperazino, each of X and Y, independently, represents a member selected from the group consisting of lower alkyl, chloro-lower alkyl, bromo-lower alkyl, fluoro-lower alkyl, phenyl, nitrophenyl, chlorophenyl, bromophenyl, lower alkyl-phenyl, hydroxyphenyl, benzyl, lower alkylbenzyl, chlorobenzyl, bromobenzyl, halogen, lower alkanoyl, benzoyl, chloro-lower alkanoyl, bromo-lower alkanoyl, fluoro-lower alkanoyl, chlorobenzoyl, nitrobenzoyl, phenacyl, nitro, amino, mono-lower alkanoylamino, mono-benzoylamino and mono- and di-lower alkylamino, and each of $m$ and $n$, independently, represents an integer ranging from 0 to 3, in an amount sufficient to control coccidiosis.

2. A process as described in claim 1 wherein said compound is administered in animal feed in an amount of 50 to 500 mg. per kg. of foodstuff.

3. A process as described in claim 2 wherein the foodstuff has a protein content of at least about 17% by weight.

4. A method of promoting the growth of young house and farm animals which comprises feeding said animals with an enriched nutritionally balanced feed, formulated by mixing with a feed of the aforesaid type having a protein content of at least about 17% by weight, from about 10 to 500 grams per ton of a member selected from the group consisting of (a) a compound of the formula

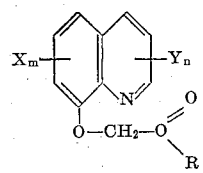

(b) a compound of the formula

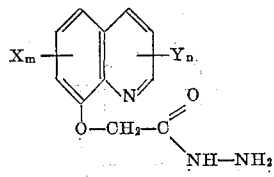

(c) a water-soluble nontoxic salt of a compound of Formula IB, and
(d) a water-soluble nontoxic salt of a compound of Formula IA, in which Formulae IB and IA:

R represents a member selected from the group consisting of hydroxy, lower alkoxy and the radical

each of $R_1$ and $R_2$, independently, represents a member selected from the group consisting of hydrogen, alkyl with from 1 to 5 carbon atoms, alkenyl with from 2 to 5 carbon atoms, lower alkoxy-lower alkyl, mono-lower alkylamino-lower alkyl, di-lower alkylamino-lower alkyl, hydroxy-lower alkoxy-lower alkyl, lower alkylamino-lower alkylamino-lower alkyl, phenyl, chlorophenyl and bromophenyl, and $R_1$ and $R_2$ taken together is a member selected from the group consisting of morpholino, piperidino and piperazino, each of X and Y, independently, represents a member selected from the group consisting of lower alkyl, chloro-lower alkyl, bromo-lower alkyl, fluoro-lower alkyl, phenyl, nitrophenyl, chlorophenyl, bromophenyl, lower alkyl-phenyl, hydroxyphenyl, benzyl, lower alkylbenzyl, chlorobenzyl, bromobenzyl, halogen, lower alkanoyl, benzoyl, chloro-lower alkanoyl, bromo-lower alkanoyl, fluoro-lower alkanoyl, chlorobenzoyl, nitrobenzoyl, phenacyl, nitro, amino, mono-lower alkanoylamino, mono-benzoylamino and mono- and di-lower alkylamino, and each of $m$ and $n$, independently, represents an integer ranging from 0 to 3.

5. A food additive composition consisting essentially of about 5 to 50% by weight calculated on the total weight of composition of α-[2-methylquinolyl-(8)-oxy]-acetic acid amide hydrochloride and the balance of a nontoxic excipient.

6. A food additive composition consisting essentially of about 5 to 50% by weight calculated on the total weight of composition of α-[2-methylquinolyl-(8)-oxy]-acetic acid amide and the balance of a nontoxic excipient.

7. A food additive composition consisting essentially of about 5 to 50% by weight calculated on the total weight of composition of α-[5-acetoquinolyl-(8)-oxy]-acetic acid methyl ester and the balance of a nontoxic excipient.

8. A food additive composition consisting essentially of about 5 to 50% by weight calculated on the total weight of composition of α-[2-methyl-quinolyl-(8)-oxy]-acetic acid ethyl ester and the balance of a nontoxic excipient.

References Cited

Thompson, Chem. Abst., vol. 51, 1957, page 15005a and 39s (subject index).

Thompson, Chem. Abst., vol. 41, 1947, pages 3902 and 3912a.

Moszew, Chem. Abst., vol. 53, 1959, page 21946h.

SAM ROSEN, *Primary Examiner.*

ALBERT T. MEYERS, *Examiner.*